US012561319B1

(12) United States Patent
Ghosh et al.

(10) Patent No.: US 12,561,319 B1
(45) Date of Patent: Feb. 24, 2026

(54) SYSTEM AND METHOD FOR ROBUST GraphQL QUERY EVALUATION

(71) Applicant: International Business Machines Corporation, Armonk, NY (US)

(72) Inventors: Sambit Ghosh, Madhyamgram (IN); Manish Kesarwani, Bengaluru (IN); Nitin Gupta, Saharanpur (IN); Renuka Sindhgatta Rajan, Bengaluru (IN); Sameep Mehta, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 19/009,404

(22) Filed: Jan. 3, 2025

(51) Int. Cl.
*G06F 16/242* (2019.01)
*G06F 16/2455* (2019.01)

(52) U.S. Cl.
CPC ........ *G06F 16/2433* (2019.01); *G06F 16/243* (2019.01); *G06F 16/2455* (2019.01)

(58) Field of Classification Search
CPC . G06F 16/2433; G06F 16/243; G06F 16/2455
USPC ........................................................ 707/769
See application file for complete search history.

(56) References Cited

U.S. PATENT DOCUMENTS

2008/0189239 A1* 8/2008 Bawa ....................... G06F 16/22
2019/0042574 A1* 2/2019 Kim ........................ G06F 18/41

2019/0370370 A1 12/2019 Wittern et al.
2020/0097559 A1 3/2020 Wittern et al.
2022/0261442 A1 8/2022 Khillar et al.
2023/0089667 A1* 3/2023 Li ........................ G06F 16/2458
                                                                707/609
2023/0350906 A1* 11/2023 Agrawal ............... G06F 16/211
2024/0184780 A1* 6/2024 Faltín ................ G06F 16/24542
2024/0386016 A1* 11/2024 Vanbrocklin ......... G06F 16/258
2024/0411759 A1* 12/2024 Pilli ..................... G06F 16/248

FOREIGN PATENT DOCUMENTS

CN        115828266 A     3/2023

* cited by examiner

*Primary Examiner* — Cam Y T Truong
(74) *Attorney, Agent, or Firm* — Amin, Turocy & Watson, LLP

(57) ABSTRACT

A system includes a processor that executes computer executable components stored in a memory. The computer executable components can comprise a generation component that generates a GraphQL query. The computer executable components can further comprise a comparison component that compares a predefined GraphQL query to the generated GraphQL query. The computer executable components can further comprise a data mutation component that creates data variations to execute on the predefined GraphQL query and the generated GraphQL query to identify false positives or false negatives of execution equivalence of the queries. The computer executable components can further comprise an evaluation component that compares results of the executed queries to determine sufficiency of the generated GraphQL query.

20 Claims, 12 Drawing Sheets

300

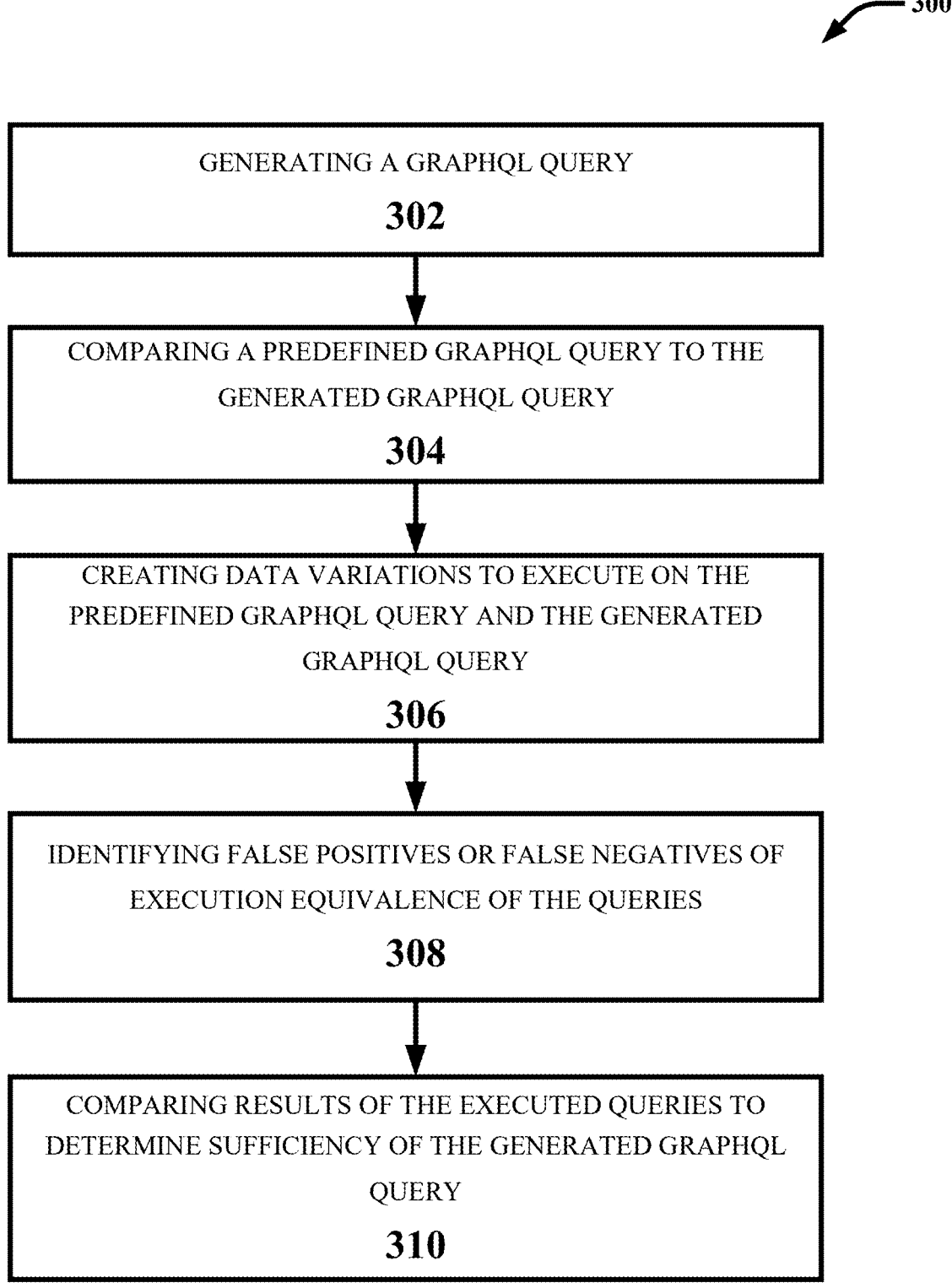

GENERATING A GRAPHQL QUERY

302

COMPARING A PREDEFINED GRAPHQL QUERY TO THE GENERATED GRAPHQL QUERY

304

CREATING DATA VARIATIONS TO EXECUTE ON THE PREDEFINED GRAPHQL QUERY AND THE GENERATED GRAPHQL QUERY

306

IDENTIFYING FALSE POSITIVES OR FALSE NEGATIVES OF EXECUTION EQUIVALENCE OF THE QUERIES

308

COMPARING RESULTS OF THE EXECUTED QUERIES TO DETERMINE SUFFICIENCY OF THE GENERATED GRAPHQL QUERY

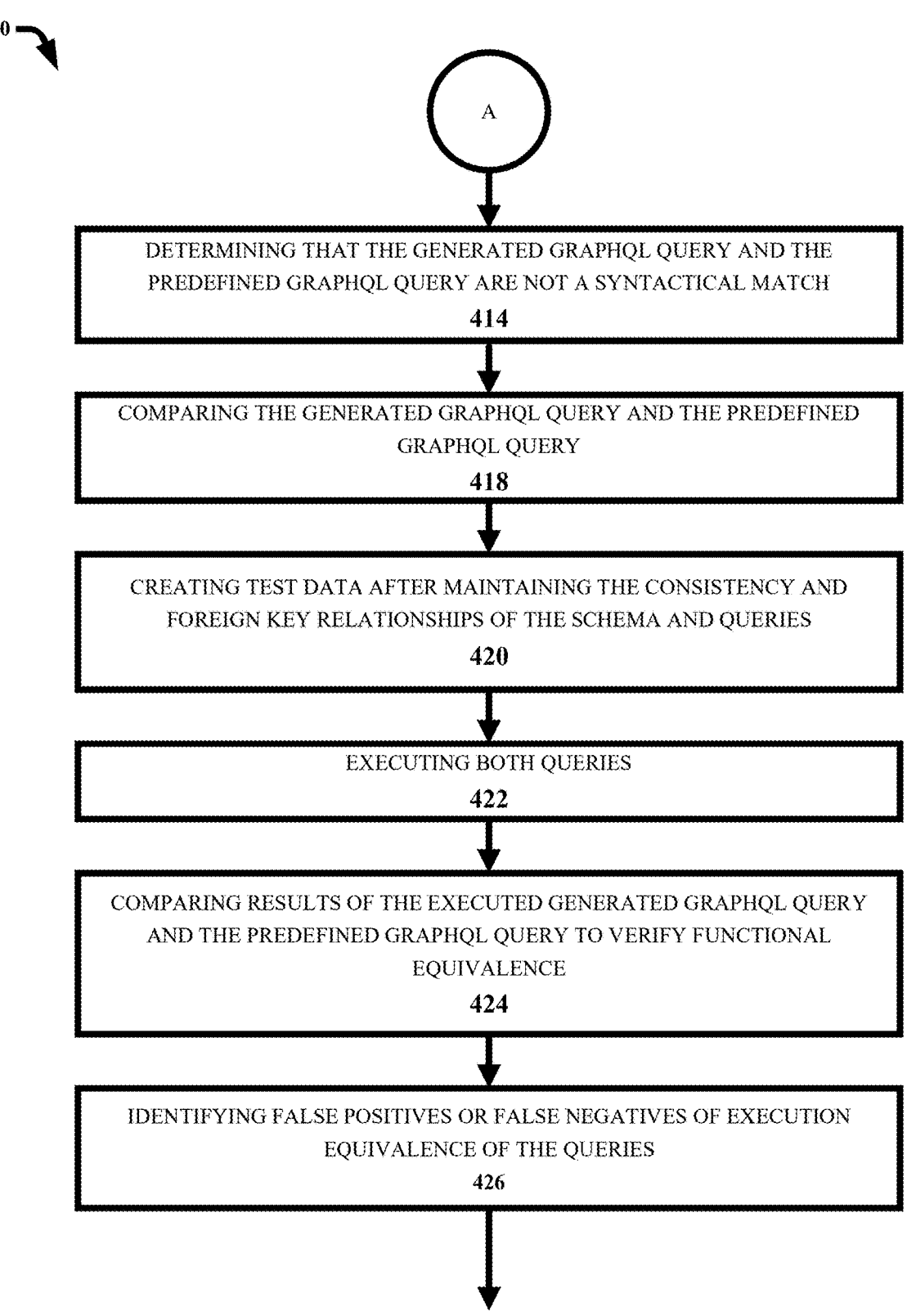

A

DETERMINING THAT THE GENERATED GRAPHQL QUERY AND THE PREDEFINED GRAPHQL QUERY ARE NOT A SYNTACTICAL MATCH
414

COMPARING THE GENERATED GRAPHQL QUERY AND THE PREDEFINED GRAPHQL QUERY
418

CREATING TEST DATA AFTER MAINTAINING THE CONSISTENCY AND FOREIGN KEY RELATIONSHIPS OF THE SCHEMA AND QUERIES
420

EXECUTING BOTH QUERIES
422

COMPARING RESULTS OF THE EXECUTED GENERATED GRAPHQL QUERY AND THE PREDEFINED GRAPHQL QUERY TO VERIFY FUNCTIONAL EQUIVALENCE
424

IDENTIFYING FALSE POSITIVES OR FALSE NEGATIVES OF EXECUTION EQUIVALENCE OF THE QUERIES
426

Evaluation System
530

FAIL TO MATCH

GENERATE
MUTATED TEST
DATA
532

EXECUTE AND
COMPARE RESULTS
542

RESULTS
MATCH?
544

FAIL TO MATCH

GENERATED
GRAPHQL
QUERY IS NOT
SUFFICENT
546

RESULTS MATCH

GENERATED
GRAPHQL
QUERY IS
SUFFICENT
548

900

COMPUTER   901

PROCESSOR SET   910

PROCESSING CIRCUITRY   920          CACHE   921

COMMUNICATION FABRIC   911

VOLATILE MEMORY   912

PERSISTENT STORAGE 913

OPERATING SYSTEM   922

GRAPHQL QUERY GENERATION AND
EVALUATION CODE

980

PERIPHERAL DEVICE SET   914

UI DEVICE SET   923          STORAGE   924          IoT SENSOR SET   925

NETWORK MODULE   915

WAN   902

END USER DEVICE   903

REMOTE SERVER   904

REMOTE DATABASE   930

PRIVATE CLOUD   906

GATEWAY   940

PUBLIC CLOUD   905

CLOUD ORCHESTRATION MODULE   941          HOST PHYSICAL MACHINE SET   942

VIRTUAL MACHINE SET   943          CONTAINER SET   944

FIG. 9

SYSTEM AND METHOD FOR ROBUST GraphQL QUERY EVALUATION

TECHNICAL FIELD

The subject disclosure relates to generating and evaluating GraphQL queries, e.g., assessing whether GraphQL queries derived from natural language inputs accurately retrieve the intended data.

BACKGROUND

GraphQL is a modern query language used for finding data in application programming interfaces (APIs), offering a more efficient and flexible alternative to traditional representational state transfer (REST) approaches. Unlike REST, which often requires multiple requests for different pieces of data, GraphQL can use a single query to request the data needed. GraphQL queries can specify the structure of the response, enabling a more efficient use of network resources. However, as GraphQL schemas grow in size and complexity, accurately structuring and validating queries can become challenging. Creating a GraphQL query requires domain-specific knowledge to accurately specify data required. Insufficient queries can lead to over-fetching or under-fetching data, impacting the efficiency and functionality of the system.

Current methods to improve GraphQL query generation have difficulties in accurately generating queries due to factors such as redundant schema structures, dependencies within the data, and schema complexity. Additionally, post-processing adjustments after query generation can be ineffective as they require schema-specific tuning and are impractical across diverse data configurations.

In addition to the complexities inherent in generating GraphQL queries, evaluating the accuracy of generated GraphQL queries currently lack methods that can reliably confirm whether a query aligns with the intended data requirements expressed in natural language query. Existing approaches tend to focus on surface-level query structure without fully assessing if the query retrieves the correct data.

SUMMARY

The following presents a summary to provide a basic understanding of some embodiments of the invention. This summary is not intended to identify key or critical elements or delineate any scope of the particular embodiments or any scope of the claims. Its sole purpose is to present concepts in a simplified form as a prelude to the more detailed description that is presented later. In some embodiments described herein, systems, computer-implemented methods, and/or computer program products that facilitate generation and evaluation of GraphQL queries.

According to an embodiment, a system can comprise a processor that executes computer executable components stored in memory. The computer executable components can comprise a generation component that generates a GraphQL query. The computer executable components can further comprise a comparison component that compares a predefined GraphQL query to the generated GraphQL query. The computer executable components can further comprise a data mutation component that creates data variations to execute on the predefined GraphQL query and the generated GraphQL query to identify false positives or false negatives of execution equivalence of the queries. The computer executable components can further comprise an evaluation component that compares results of executed queries to determine sufficiency of the generated GraphQL query.

According to another embodiment, a computer-implemented method can comprise generating, by a system operatively coupled to a processor, a GraphQL query. The computer-implemented method comprises comparing, by a system, a predefined GraphQL query to the generated GraphQL query. The computer-implemented method further comprises creating, by a system, data variations to execute on the predefined GraphQL query and the generated GraphQL query. The computer implemented method can further comprise identifying, by the system, false positives or false negatives of execution equivalence of the queries. The computer implemented method can further comprise comparing, by the system, results of the executed queries to determine sufficiency of the generated GraphQL query.

According to another embodiment, a computer program product comprising a computer readable storage medium having program instructions embodied therewith, the program instructions executable by a processor to cause the processor to generate, by the processor, a GraphQL query. The program instructions can also cause the processor to compare, by the processor, a predefined GraphQL query to the generated GraphQL query. The program instructions can also cause the processor to create, by the processor, data variations to execute on the predefined GraphQL query and the generated GraphQL query. The program instructions can further cause the processor to identify, by the processor, false positives or false negatives of execution equivalence of the queries. The program instructions can also cause the processor to compare, by the processor, results of the executed queries to determine sufficiency of the generated GraphQL query.

BRIEF DESCRIPTION OF THE DRAWINGS

FIGS. 3, 4A, and 4B illustrate flow diagrams of example computer implemented methods that can facilitate generation and evaluation of GraphQL queries in accordance with some embodiments described herein.

FIG. 9 illustrates a block diagram of an example computing environment in which some embodiments described herein can be facilitated.

DETAILED DESCRIPTION

Figure 1:
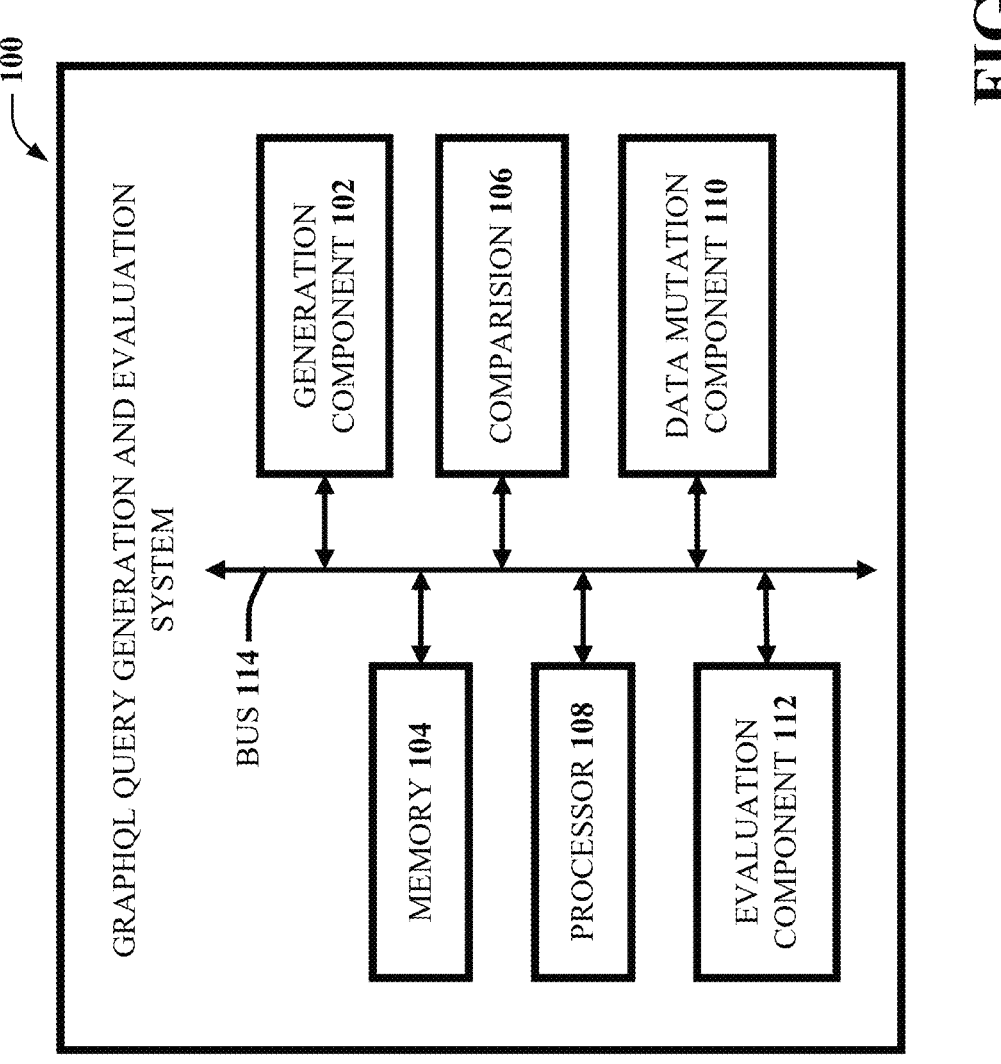
FIGS. 1 and 2 illustrate example systems that can facilitate generation and evaluation of GraphQL queries in accordance with some embodiments described herein.

The following detailed description is merely illustrative and is not intended to limit embodiments, applications, and/or uses of embodiments. Furthermore, there is no intention to be bound by any expressed or implied information presented in the preceding Background or Summary sections, or in the Detailed Description section.

Efficient and accurate data retrieval is essential for meeting user demands and optimizing system performance. Utilizing the power of GraphQL can enable systems to retrieve only the data needed in a single request. However, current methods of GraphQL query generation make it challenging to ensure that generated queries align precisely with the requested information. By accurately evaluating GraphQL queries, limitations of GraphQL query generation can be mitigated.

Current methods for improving GraphQL query generation and evaluation encounter significant challenges, especially when managing complex or large schemas. Redundant schema structure, intricate dependencies within the data, and detailed schema hierarchies complicate the generation process and make it difficult for existing approaches to accurately capture data requirements while avoid over-fetching or under-fetching. Redundant schema structures can lead to inefficient data retrieval by repeating elements within a schema. Intricate dependencies within the data can make query generation and data retrieval more challenging because they require a precise understanding of how different data elements are interconnected. Additionally, detailed schema hierarchies can also complicate query generation and evaluation by requiring more intricate navigation paths to access relevant data. Attempts to refine or correct generated queries through post-processing have also proven largely ineffective. Post-processing adjustments often require schema-specific tuning, which can fail to generalize well across diverse data environments. This lack of flexibility can limit the practicality of post-processing as a solution for consistent query refinement.

In addition to difficulties in generating accurate queries, evaluating whether a generated GraphQL query meets the requirements of a natural language input can present further challenges. Current evaluation techniques primarily focus on checking for syntactic matches or verifying if the output data matches the results of an expected query, which often leads false positives or false negatives, such as sufficient queries being inaccurately ruled as insufficient. The current evaluation methods can create redundant schemas, cyclic dependencies, zero-tuple problems, or lucky hallucinations. Redundant schema structures introduce unnecessary or duplicate elements into a database. In cyclic dependencies, database elements reference each other in loops and can cause errors or endless processing loops. The zero-tuple problem can occur when a query returns an empty result unexpectedly resulting in missing data. Lucky hallucinations refer to instances where a query accidentally produces the correct answer without fully aligning with the intended data requirements, creating a misleading sense of accuracy.

The evaluations methods can overlook important contextual factors, particularly in schemas with complex structures and dependencies. Thus, there is a pressing need for more sophisticated evaluation method that can verify whether generated GraphQL queries effectively fulfill the data requirements implied by natural language inputs across a wide variety of schema configurations and data environments.

In relation to evaluation of GraphQL queries, embodiments of the present disclosure produce a solution to one or more of these problems. These embodiments can solve such problems by generating a GraphQL query, comparing a predefined GraphQL query to the generated GraphQL query, creating data variations to execute on the predefined GraphQL query and the generated GraphQL query, identifying false positives or false negatives of execution equivalence of the queries, and comparing results of the executed queries to determine sufficiency of the generated GraphQL query.

Systems described herein can provide solutions for determining whether generated GraphQL queries accurately fulfill a natural language query request. A system can train a foundational model that, when provided with a GraphQL schema and a natural language (NL) query, can produce a corresponding GraphQL query needed to retrieve the necessary data for fulfilling the query's request. A system can evaluate the sufficiency of the generated GraphQL query by comparing syntactically, structurally, or the results to a predefined GraphQL query. A system can utilize the power of artificial intelligence to train an artificial intelligence model with sufficient generated GraphQL queries to produce accurate GraphQL queries. This approach can ensure that initial natural language query retrieves the correct data without missing elements or retrieving unnecessary items.

The innovations disclosed herein can improve ability of generating and evaluating GraphQL queries, especially for large and complex GraphQL schemas.

In relation to generation and evaluation of GraphQL queries, embodiments disclosed herein produce a solution to one or more of these problems. These embodiments can solve such problems by generating a GraphQL query; by comparing a predefined GraphQL query to the generated GraphQL query; by creating data variations to execute on the predefined GraphQL query and the generated GraphQL query; by identifying false positives or false negatives of execution equivalence of the queries; and by comparing results of the executed queries to determine sufficiency of the generated GraphQL query.

According to an embodiment, a system can include a processor that executes computer executable components stored in a memory. The computer executable components can include a generation component that generates a GraphQL query. The computer executable components can further include a comparison component that compares a predefined GraphQL query to the generated GraphQL query. The computer executable components can further include a data mutation component that creates data variations to execute on the predefined GraphQL query and the generated GraphQL query to identify false positives or false negatives of execution equivalence of the queries. The computer executable components can further include an evaluation component that compares results of the executed queries to determine sufficiency of the generated GraphQL query.

In some embodiments, the system can further comprise an artificial intelligence component that trains an artificial intelligence model to generate data variations. The data variations produced by the artificial intelligence model can be used as test data to evaluate the sufficiency of GraphQL queries. In various embodiments, the system can further comprise an artificial intelligence component that trains an artificial intelligence model to evaluate sufficiency of the generated GraphQL query. By utilizing an artificial intelligence model, the system can enhance the ability to accurately assess whether a generated GraphQL query fully meets the data requirements expressed in the natural language input. In other embodiments, an artificial intelligence component can be used to train an artificial intelligence model on historical natural language inputs along with sufficiently generated GraphQL queries to produce accurate future GraphQL queries. The system can enhance its ability to generate precise, contextually appropriate queries.

Advantages of this system may include enhanced accuracy in evaluating generated GraphQL queries, streamlined data validation processes, reduced need for manual query inspection, and improved reliability of automated query generation systems.

According to some embodiments, the above-described computer system may be implemented as a computer-implemented method or as a computer program product.

Some embodiments of the present disclosure are now described with reference to the drawings. In the drawings, like referenced numerals are used to refer to like elements throughout. In the following description, for purposes of explanation, numerous specific details are set forth in order to provide a more thorough understanding of the embodiments. In various cases, some embodiments may be practiced without these specific details, yet a person having ordinary skill in the art will recognize that such embodiments are within metes and bounds of this disclosure.

FIG. 1 illustrates an example system 100 for facilitating generation and evaluation of GraphQL queries. System 100 uses a generation component, a comparison component, a data mutation component, and an evaluation component. The generation component generates a GraphQL query. The comparison component compares a predefined GraphQL query to the generated GraphQL query. The data mutation component creates data variations to execute on the predefined GraphQL query and the generated GraphQL query to identify false positives or false negatives of execution equivalence of the queries. The evaluation component compares results of the executed queries to determine sufficiency of the generated GraphQL query.

Aspects of systems (e.g., systems 100, 200, and the like), apparatuses, or processes in various embodiments of the present disclosure can constitute one or more machine-executable components embodied within one or more machines. For example, the components may be embodied in one or more computer readable mediums (or media) associated with one or more machines. Such components, when executed by one or more machines (e.g., computers, computing devices, virtual machines, etc.) can cause the machines to perform the operations described. System 100 may comprise a generation component 102, a memory 104, a comparison component 106, a processor 108, a data mutation component 110, an evaluation component 112, and a system bus 114.

The system 100 and/or the components of the system 100 can use hardware and/or software to solve problems that are highly technical in nature. System 100 solves problems that are not abstract and that cannot be performed as a set of mental acts by a human. Further, some of the processes may be performed by specialized computers for carrying out defined tasks related to recovery plan development. The system 100 and/or components of the system 100 can be employed to solve new problems that arise through advancements in technologies. The system 100 can provide technical improvements to generating and evaluating GraphQL queries by enhancing the accuracy in evaluating generated GraphQL queries, streamlined data validation processes, reduced need for manual query inspection, and improved reliability of automated query generation systems.

System 100 may include a processor 108. In some embodiments, the processor 108 can execute a component or subcomponent associated with the system 100. Components or subcomponents associated with the system 100 can include one or more machine readable, writable, and/or executable instructions. In some embodiments, the system 100 can include a memory 104, and the memory 104 can store one or more components and/or subcomponents associated with the system 100. In some embodiments, the processor 108 can execute a component stored in the memory 104.

In some embodiments, the system 100 can include a computer-readable memory 104 that can be operably connected to the processor 108. The memory 104 can store computer-executable instructions that, upon execution by the processor 108, may cause the processor 108 and/or one or more other components of the system 100 (e.g., the generation component 102, the comparison component 106, the data mutation component 110, and/or the evaluation component 112) to perform one or more actions. In some embodiments, the memory 104 can store computer-executable components (e.g., the generation component 102, the comparison component 106, the data mutation component 110, and/or the evaluation component 112).

The system 100 and/or a component thereof as described herein can be communicatively, electrically, operatively, optically, and/or otherwise coupled to one another via a bus 114. The bus 114 can include one or more of a memory bus, memory controller, peripheral bus, external bus, local bus, and/or another type of bus that can employ one or more bus architectures. In some embodiments, the system 100 can be coupled (e.g., communicatively, electrically, operatively, optically, and/or the like) to one or more external systems (e.g., an electrical output production system, one or more output targets, an output target controller, and/or the like). In some embodiments, the system 100 can be coupled to one or more external sources, and/or devices (e.g., classical computing devices, communication devices, and/or like devices), such as via a network. In some embodiments, one or more of the components of the system 100 can reside in the cloud and/or locally in a local computing environment (e.g., at one or more specified locations).

In addition to the processor 108 and/or the memory 104 described above, the system 100 can include one or more computer and/or machine readable, writable, and/or executable components and/or instructions. When executed by the processor 108, these components and/or instructions can enable performance of one or more operations defined by the component(s) and/or instruction(s).

In various embodiments, the generation component 102 can generate a GraphQL query. Generation component 102 can use both a Schema and a Natural Language Query to generate the GraphQL query.

According to some embodiments, the comparison component 106 compares a predefined GraphQL query to the generated GraphQL query. Comparison component 106 can determine if the generated GraphQL query and the predefined GraphQL query are a syntactical match. If two GraphQL queries are syntactically the same, they have identical text structure, including the fields, arguments, and aliases used. Upon a determination that the generated GraphQL query and the predefined GraphQL query are not a syntactical match, comparison component 106 can compare the schema of the generated GraphQL query and the predefined GraphQL query. Comparing schemas can check for structural equivalence. Upon a determination that the generated GraphQL query and the predefined GraphQL query are a syntactical match, comparison component 106 can compare results of executed generated GraphQL query and predefined GraphQL query to verify functional equivalence.

In various embodiments, the data mutation component 110 can create data variations to execute on the predefined GraphQL query and the generated GraphQL query to identify false positives or false negatives of execution equivalence of the queries. GraphQL queries are executional equivalent if the queries follow the same execution path and produce the same data result, regardless of syntactic differences. A false positive occurs when queries are mistakenly identified as equivalent, even though they execute differently and may produce different results. A false negative happens when queries that execute identically and produce the same results are incorrectly treated as different, leading to redundant processing. Identifying false positives and false negatives can occur by creating mutated test data, executing the queries with the test data, and assessing the results of the queries.

Upon a determination that the generated GraphQL query and the predefined GraphQL query are not a syntactical match, data mutation component 110 can create and compare test data. In other embodiments, data mutation component 110 can modify one or more foreign key values while preserving foreign key restraints. Foreign key values are identifiers in a database table that link records from one table to records in another, establishing relationships between data entities. By modifying one or more foreign key values, the system can maintain relational integrity, ensuring that data across different tables remains accurately connected.

In some embodiments, the evaluation component 112 can compare results of the executed queries to determine sufficiency of the generated GraphQL query. Upon a determination that the generated GraphQL query and the predefined GraphQL query are a syntactical match, evaluation component 112 can determine sufficiency of the generated GraphQL query. Once the generated GraphQL query and the predefined GraphQL query are determined to be a syntactical match, the system can determine that the generated GraphQL query is sufficient query.

Figure 2:
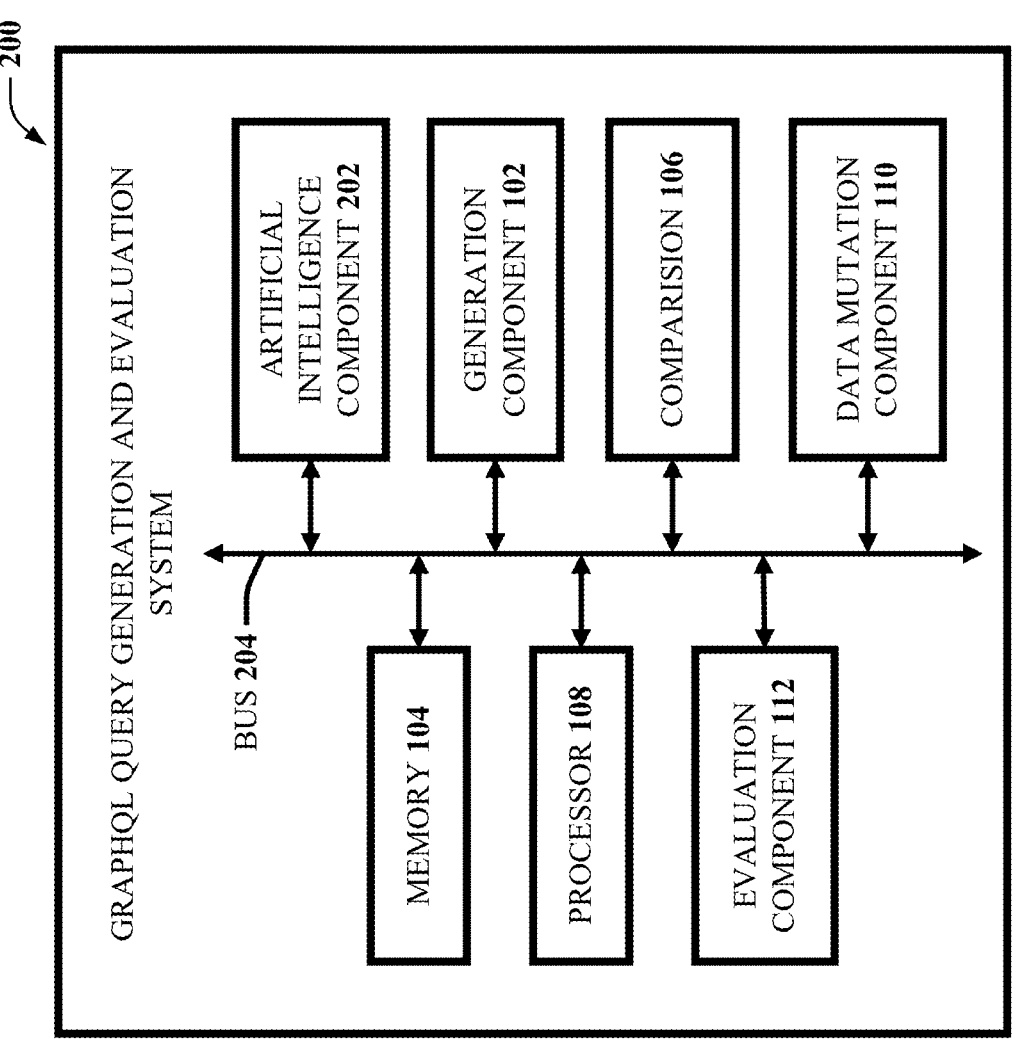

FIG. 2 illustrates an example system 200 that can facilitate generation and evaluation of GraphQL queries. System 200 uses a generation component 102, a memory 104, a comparison component 106, a processor 108, a data mutation component 110, an evaluation component 112, an artificial intelligence component 202, and a system bus 204. The generation component 102 generates a GraphQL query. The comparison component 106 compares a predefined GraphQL query to the generated GraphQL query. The data mutation component 110 creates data variations to execute on the predefined GraphQL query and the generated GraphQL query to identify false positives or false negatives of execution equivalence of the queries. The evaluation component 112 compares results of the executed queries to determine sufficiency of the generated GraphQL query. Description of like components has been omitted for the sake of brevity.

In various embodiments, artificial intelligence component 202 trains an artificial intelligence model to generate data variations. The data variations produced by the artificial intelligence model can be used as test data to evaluate the sufficiency of GraphQL queries. In various embodiments, artificial intelligence component 202 can train an artificial intelligence model to evaluate sufficiency of the generated GraphQL query. By utilizing an artificial intelligence model, the system can enhance the ability to accurately assess whether a generated GraphQL query fully meets the data requirements expressed in the natural language input. In other embodiments, artificial intelligence component 202 can be used to train an artificial intelligence model on historical natural language inputs along with sufficiently generated GraphQL queries to produce accurate future GraphQL queries. The system can enhance its ability to generate precise, contextually appropriate queries.

The systems and/or devices are described herein with respect to interaction between one or more components. Such systems and/or components can include the components and/or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity but known by those of skill in the art.

Next, FIG. 3 illustrates a flow diagram of a method 300 that can facilitate generation and evaluation of GraphQL queries in accordance with some embodiments described herein, such as the system 200 of FIG. 2 and the system 100 of FIG. 1. While the method 300 is described relative to the system 200 of FIG. 2, the method 300 can be applicable also to other systems described herein. Repetitive description of like elements and/or processes employed in respective embodiments is omitted for sake of brevity.

For simplicity of explanation, the computer-implemented methods provided herein are depicted and/or described as a series of actions. It is to be understood that the subject matter is not limited by the actions illustrated and/or by the order thereof. For example, actions can occur in one or more orders, concurrently, and/or with other acts not presented and described herein. Furthermore, not all illustrated actions can be utilized to implement the computer-implemented methods in accordance with the described subject matter. In addition, the computer-implemented methods could alternatively be represented as a series of interrelated states via a state diagram or events. Additionally, the computer-implemented methods described in this specification are capable of being stored on an article of manufacture to facilitate transporting and transferring the computer-implemented methods to computers. The term article of manufacture, as used herein, encompasses a computer program accessible from any computer-readable device or storage media.

At 302, the method 300 includes generating a GraphQL query. The method 300 can use a system operatively coupled to the processor (e.g., generation component 102) to generate a GraphQL query. A GraphQL query can be generated by a foundational model (FM) that uses a natural language input along with a schema.

At 304, method 300 includes comparing a predefined GraphQL query to the generated GraphQL query. The method 300 can use a system operatively coupled to the processor (e.g., comparison component 106) to compare a predefined GraphQL query to the generated GraphQL query. The generated GraphQL query and the predefined GraphQL query can be compared syntactically, structurally, or by the results of the queries.

At 306, method 300 includes creating data variations to execute on the predefined GraphQL query and the generated GraphQL query. The method 300 can use a system operatively coupled to the processor (e.g., data mutation component 110) to create data variations to execute on the predefined GraphQL query and the generated GraphQL query. The mutated test data can be used to determine whether the generated GraphQL query and the predefined GraphQL query produce the same results.

At 308, method 300 includes identifying false positives or false negatives of execution equivalence of the queries. GraphQL queries are executional equivalent if the queries follow the same execution path and produce the same data result, regardless of syntactic differences. A false positive occurs when queries are mistakenly identified as equivalent, even though they execute differently and may produce different results. A false negative happens when queries that execute identically and produce the same results are incorrectly treated as different, leading to redundant processing. The method 300 can use a system operatively coupled to the processor (e.g., data mutation component 110) to identify false positives or false negatives of execution equivalence of the queries.

At 310, method 300 includes comparing results of the executed queries to determine sufficiency of the generated GraphQL query. The method 300 can use a system operatively coupled to the processor (e.g., evaluation component 112) to compare results of the executed queries to determine sufficiency of the generated GraphQL query. If the results of the generated GraphQL query and the predefined GraphQL query are the same, then the system can determine that the generated GraphQL query is sufficient. If the results of the generated GraphQL query and the predefined GraphQL query are different, then the system can determine that the generated GraphQL query is not sufficient.

In some embodiments, method 300 is performed by a system, such as system 100 of FIG. 1 or system 200 of FIG. 2. The generating of a GraphQL query 302 can be performed by a generation component (e.g., generation component 102 of FIG. 2). comparing a predefined GraphQL query to the generated GraphQL query 304 can be performed by a comparison component (e.g., comparison component 106). Creating data variations to execute on the predefined GraphQL query and the generated GraphQL query 306 can be performed by a data mutation component (e.g., data mutation component 110). The identifying false positives or false negatives of execution equivalence of the queries 308 can be performed by a data mutation component (e.g., data mutation component 110). The comparing results of the executed queries to determine sufficiency of the generated GraphQL query 310 can be performed by an evaluation component (e.g., evaluation component 112).

Next, FIG. 4 illustrates a flow diagram of a method 400 that can facilitate evaluation of GraphQL queries in accordance with some embodiments described herein. While the method 400 is described relative to the system 200 of FIG. 2, the method 400 can be applicable also to other systems described herein, such as the system 100 of FIG. 1.

At 402, the method 400 includes generating a GraphQL query. The method 400 can use a system operatively coupled to the processor (e.g., generation component 102) to generate a GraphQL query.

At 404, the method 400 includes using both a Schema and a Natural Language Query to generate the GraphQL query. The method 400 can use a system operatively coupled to the processor (e.g., generation component 102) to use both a Schema and a Natural Language Query to generate the GraphQL query. A GraphQL query can be generated by a foundational model (FM) that uses a natural language input along with a schema.

At 406, method 400 includes comparing a predefined GraphQL query to the generated GraphQL query. The method 400 can use a system operatively coupled to the processor (e.g., comparison component 106) to compare a predefined GraphQL query to the generated GraphQL query. The generated GraphQL query and the predefined GraphQL query can be compared syntactically, structurally, or by the results of the queries.

At 408, method 400 includes determining if the generated GraphQL query and the predefined GraphQL query are a syntactical match. If the GraphQL queries are syntactically the same, they have identical text structure, including the fields, arguments, and aliases used. The method 400 can use a system operatively coupled to the processor (e.g., comparison component 106) to determine if the generated GraphQL query and the predefined GraphQL query are a syntactical match.

At 410, method 400 includes determining sufficiency of the generated GraphQL query. The method 400 can use a system operatively coupled to the processor (e.g., evaluation component 112) to determine sufficiency of the generated GraphQL query.

If the generated GraphQL query and the predefined GraphQL query are not a syntactical match in step 408, the flow diagram proceeds to the methods represented by the circular element labeled 'A,' which serves as an abstraction of the methods associated with the process described herein. Due to space constraints within FIG. 4A, the specific details and steps of these methods are further illustrated in FIG. 4B. Element 'A' acts as a reference to the expanded depiction of these methods in FIG. 4B, facilitating a clearer understanding of their implementation.

At 428, method 400 includes training an artificial intelligence model to generate data variations. The method 400 can use a system operatively coupled to the processor (e.g., artificial intelligence component 202) to train an artificial intelligence model to generate data variations. The data variations produced by the artificial intelligence model can be used as test data to evaluate the sufficiency of GraphQL queries.

At 430, method 400 includes evaluating sufficiency of the generated GraphQL query. The method 400 can use a system operatively coupled to the processor (e.g., artificial intelligence component 202) to evaluate sufficiency of the generated GraphQL query. In some embodiments, an artificial intelligence model can be trained to evaluate sufficiency of the generated GraphQL query. By utilizing an artificial intelligence model, the system can enhance the ability to accurately assess whether a generated GraphQL query fully meets the data requirements expressed in the natural language input.

One or more systems, devices, computer program products, and/or computer-implemented methods provided herein relate to generating and evaluating GraphQL queries. A system can include a processor that executes computer executable components stored in memory. The computer executable components can include a generation component that generates a GraphQL query. The computer executable components can further include a comparison component that compares a predefined GraphQL query to the generated GraphQL query. The computer executable components can further include a data mutation component that creates data variations to execute on the predefined GraphQL query and the generated GraphQL query to identify false positives or false negatives of execution equivalence of the queries. The computer executable components can further include an evaluation component that compares results of the executed queries to determine sufficiency of the generated GraphQL query.

Advantages of this system may include enhanced accuracy in evaluating generated GraphQL queries, streamlined data validation processes, reduced need for manual query inspection, and improved reliability of automated query generation systems.

According to some embodiments, the comparison component compares a predefined GraphQL query to the generated GraphQL query. Comparison component can determine if the generated GraphQL query and the predefined GraphQL query are a syntactical match. If two GraphQL queries are syntactically the same, they have identical text structure, including the fields, arguments, and aliases used. Upon a determination that the generated GraphQL query and the predefined GraphQL query are not a syntactical match, comparison component can compare the schema of the generated GraphQL query and the predefined GraphQL query. Comparing schemas can check for structural equivalence. Upon a determination that the generated GraphQL query and the predefined GraphQL query are a syntactical match, comparison component 106 can compare results of the executed generated GraphQL query and the predefined GraphQL query to verify functional equivalence.

In various embodiments, the data mutation component can create data variations to execute on the predefined GraphQL query and the generated GraphQL query to identify false positives or false negatives of execution equivalence of the queries. GraphQL queries are executional equivalent if the queries follow the same execution path and produce the same data result, regardless of syntactic differences. A false positive occurs when queries are mistakenly identified as equivalent, even though they execute differently and may produce different results. A false negative happens when queries that execute identically and produce the same results are incorrectly treated as different, leading to redundant processing. Identifying false positives and false negatives can occur by creating mutated test data, executing the queries with the test data, and assessing the results of the queries.

Upon a determination that the generated GraphQL query and the predefined GraphQL query are not a syntactical match, data mutation component can create and compare test data. In other embodiments, data mutation component can modify one or more foreign key values while preserving foreign key restraints. Foreign key values are identifiers in a database table that link records from one table to records in another, establishing relationships between data entities. By modifying one or more foreign key values, the system can maintain relational integrity, ensuring that data across different tables remains accurately connected.

In some embodiments, the evaluation component can compare results of the executed queries to determine sufficiency of the generated GraphQL query. Upon a determination that the generated GraphQL query and the predefined GraphQL query are a syntactical match, evaluation component can determine sufficiency of the generated GraphQL query. Once the generated GraphQL query and the predefined GraphQL query are determined to be a syntactical match, the system can determine that the generated GraphQL query is sufficient query.

In various embodiments, artificial intelligence component trains an artificial intelligence model to generate data variations. The data variations produced by the artificial intelligence model can be used as test data to evaluate the sufficiency of GraphQL queries. In various embodiments, the artificial intelligence component can train an artificial intelligence model to evaluate sufficiency of the generated GraphQL query. By utilizing an artificial intelligence model, the system can enhance the ability to accurately assess whether a generated GraphQL query fully meets the data requirements expressed in the natural language input. In other embodiments, the artificial intelligence component can be used to train an artificial intelligence model on historical natural language inputs along with sufficiently generated GraphQL queries to produce accurate future GraphQL queries. The system can enhance its ability to generate precise, contextually appropriate queries.

Figure 4A:
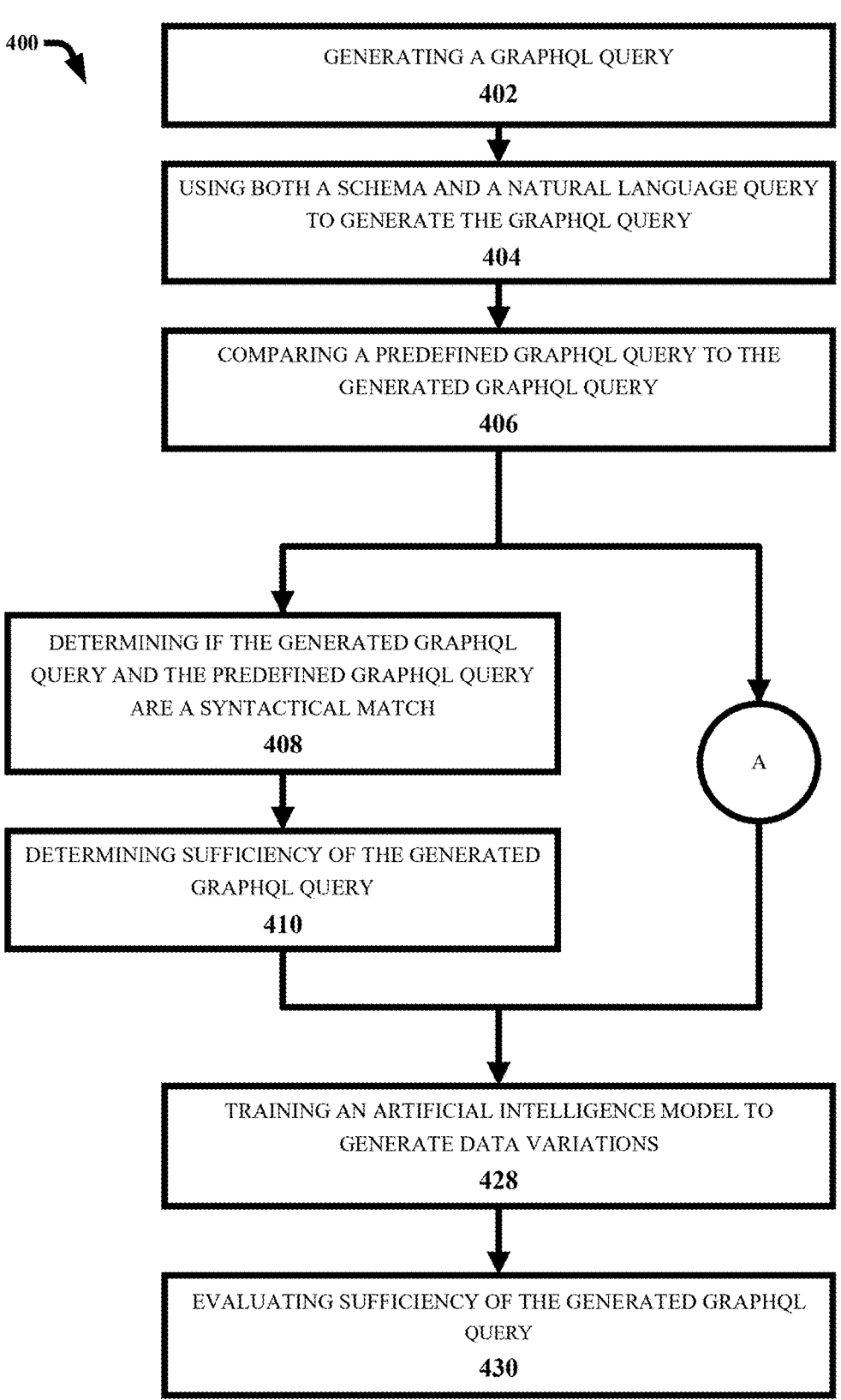

FIG. 4B illustrates a flow diagram of example computer implemented methods that can facilitate generation and evaluation of GraphQL queries in accordance with some embodiments described herein. The element labeled 'A' in FIG. 4A represents the methods illustrated in FIG. 4B.

At 414, method 400 includes determining if the generated GraphQL query and the predefined GraphQL query are not a syntactical match. If two GraphQL queries are not syntactically the same, they do not have identical text structure, including the fields, arguments, and aliases used. The method 400 can use a system operatively coupled to the processor (e.g., comparison component 106) to determine if the generated GraphQL query and the predefined GraphQL query are not a syntactical match.

At 418, method 400 includes comparing the generated GraphQL query and the predefined GraphQL query. The method 400 can use a system operatively coupled to the processor (e.g., comparison component 106, data mutation component 110) to compare the generated GraphQL query and the predefined GraphQL query. Comparing the schemas can check for structural equivalence.

At 420, method 400 includes creating test data after maintaining the consistency and foreign key relationships of the schema and queries. The method 400 can use a system operatively coupled to the processor (e.g., comparison component 106, data mutation component 110 to create test data after maintaining the consistency and foreign key relationships of the schema and queries. The system can use the created mutated test data to run the queries and determine equivalency. By modifying one or more foreign key values, the system can maintain relational integrity, ensuring that data across different tables remains accurately connected.

At 422, method 400 includes executing both queries. The method 400 can use a system operatively coupled to the processor (e.g., evaluation component 112) to execute both queries using the mutated test data. The system can use the mutated test data to run queries.

At 424, method 400 includes comparing results of the executed generated GraphQL query and the predefined GraphQL query to verify functional equivalence. The method 400 can use a system operatively coupled to the processor (e.g., evaluation component 112) to compare results of the executed generated GraphQL query and the predefined GraphQL query to verify functional equivalence. If the results of the generated GraphQL query and the predefined GraphQL query are the same, then the system can determine that the generated GraphQL query is sufficient. If the results of the generated GraphQL query and the predefined GraphQL query are different, then the system can determine that the generated GraphQL query is not sufficient.

At 426, method 400 includes identifying false positives or false negatives of execution equivalence of the queries. GraphQL queries are executional equivalent if the queries follow the same execution path and produce the same data result, regardless of syntactic differences. A false positive occurs when queries are mistakenly identified as equivalent, even though they execute differently and may produce different results. A false negative happens when queries that execute identically and produce the same results are incorrectly treated as different, leading to redundant processing. The method 400 can use a system operatively coupled to the processor (e.g., data mutation component 110) to identify false positives or false negatives of execution equivalence of the queries.

Figure 5A:
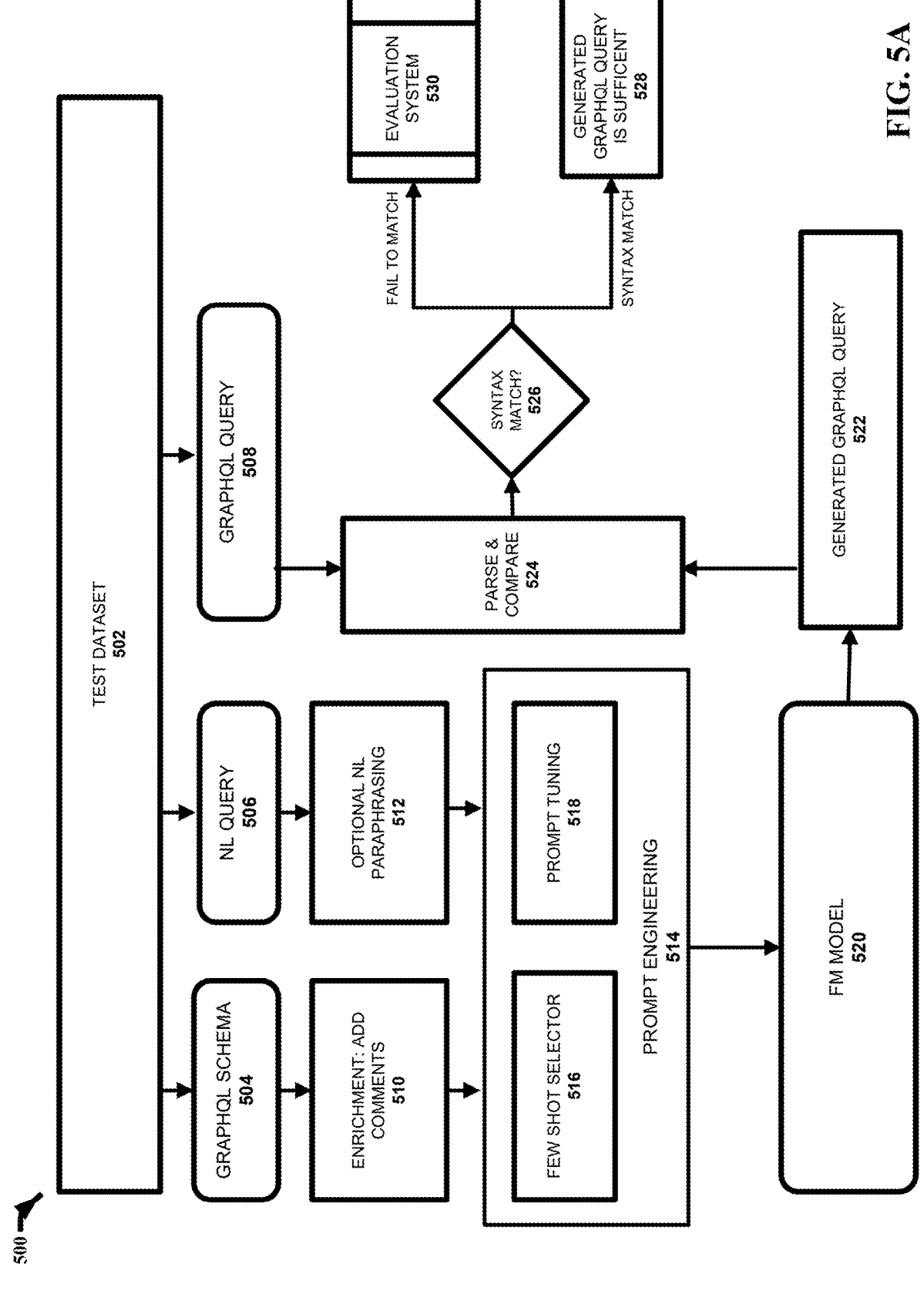
FIG. 5A illustrates a process flow diagram of the method of generating and evaluating GraphQL queries in accordance with some embodiments described herein.

FIG. 5A illustrates a process flow diagram of the method of generating and evaluating GraphQL queries in accordance with some embodiments described herein. At 502, the test dataset can be used to generate the GraphQL schema 504, the natural language (NL) query 506, or the predefined GraphQL query 508. The GraphQL schema 504 can undergo a schema enrichment in step 510. In 510, the schema can be enhanced by added comments, providing additional context to clarify its structure and relationships. Parallel to this, the natural language query 506 can be refined through a paraphrasing step 512, which can reword the query. Both the enriched schema 510 and the paraphrased natural language query 512 are then prepared for the prompt engineering stage 514. Within prompt engineering 514, two specific techniques can be applied: a few-shot selector 516 and prompt tuning 518. The few-shot selector 516 can identify relevant example queries to guide the model by using a pool of few shot samples. Prompt tuning 518 can optimize the prompt to improve response accuracy. Together, these steps can refine the inputs to ensure that the generated GraphQL query accurately reflects the natural language request. The foundational model (FM) 520 can produce a generated GraphQL query. The foundational model 520 can use a large language model to generate a GraphQL query.

The predefined GraphQL query 508 and the generated GraphQL query 522 can be parsed and compared for a syntactical equivalence in 524. At 526, the system can decided whether the predefined GraphQL query 508 and the generated GraphQL query 522 are syntactically equivalent. If two GraphQL queries are syntactically the same, they have identical text structure, including the fields, arguments, and aliases used. If the predefined GraphQL query 508 and the generated GraphQL query 522 are not a syntactical match, the predefined GraphQL query 508 and the generated GraphQL query 522 can be further evaluated by the evaluation system subprocess 530. In the evaluation system subprocess 530, the system can use data mutation to further evaluate whether the predefined GraphQL query 508 and the generated GraphQL query 522 are functionally equivalent or not. If the predefined GraphQL query 508 and the generated GraphQL query 522 are a syntactical match, the generated GraphQL query 522 can be determined to be a sufficient query 528.

Figure 5B:
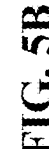
FIG. 5B illustrates a flow diagram of the evaluation system subprocess in FIG. 5A in accordance with some embodiments described herein.

FIG. 5B illustrates a flow diagram of the evaluation system subprocess in FIG. 5A in accordance with some embodiments described herein. In FIG. 5A, if the predefined GraphQL query 508 and the generated GraphQL query 522 fail to match syntactically, the predefined GraphQL query 508 and the generated GraphQL query 522 can be inputted to the evaluation system 530. At 532, the system can generate mutated test data. After the mutated test data is generated 532, the system can execute and compare the results of the predefined GraphQL query 508 and the generated GraphQL query 522 using the test data created 542. At 544, the system can determine if the results match from running the predefined GraphQL query 508 and the generated GraphQL query 522 using the mutated test data. If the results from running the queries match, the generated GraphQL query 522 can be determined to be a sufficient query 548. If the results from running the queries do not match, generated GraphQL query 522 can be determined to not be a sufficient query 546.

Figure 5C:
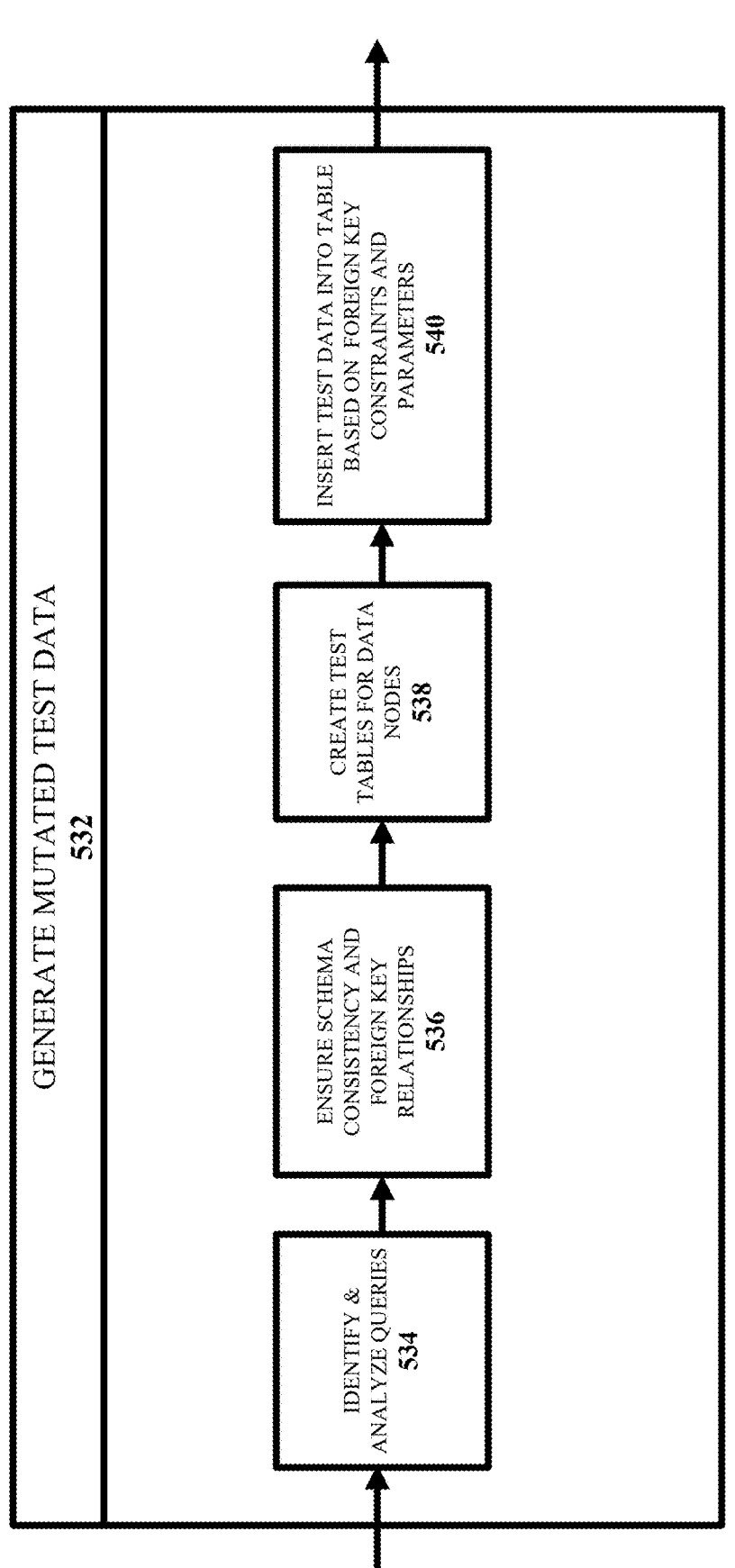
FIG. 5C illustrates a flow diagram of the generate mutated test data subprocess in FIG. 5B in accordance with some embodiments described herein.

FIG. 5C illustrates a flow diagram of the generate mutated test data subprocess in FIG. 5B in accordance with some embodiments described herein. In FIG. 5B, the evaluation system 530 can generated mutated test data 532.

To generate mutated test data, first the system can identify and analyze the queries 534. To analyze the queries, the system can verify that the queries return the expected fields. Additionally, the system can validate the parameters for each query to confirm they meet the expected types, nullability requirements, or align with the schema's defined constraints. Next, at 536, the system can ensure schema consistency and foreign key relationships. Foreign key relationships are links between tables where a column in one table references the primary key of another to ensure data consistency. By confirming that each foreign key is correctly linked to a valid primary key in the corresponding table, the system can prevent disconnected records (orphan records) where a child record would reference missing parent data. At 538 the system can create test tables for data nodes. By creating minimal tables or structures that represent test data, the system can populate each field with distinct values and can ensure to cover edge cases. At 540, the system can insert test data into a table based on the foreign key constraints and parameters.

Figure 6:
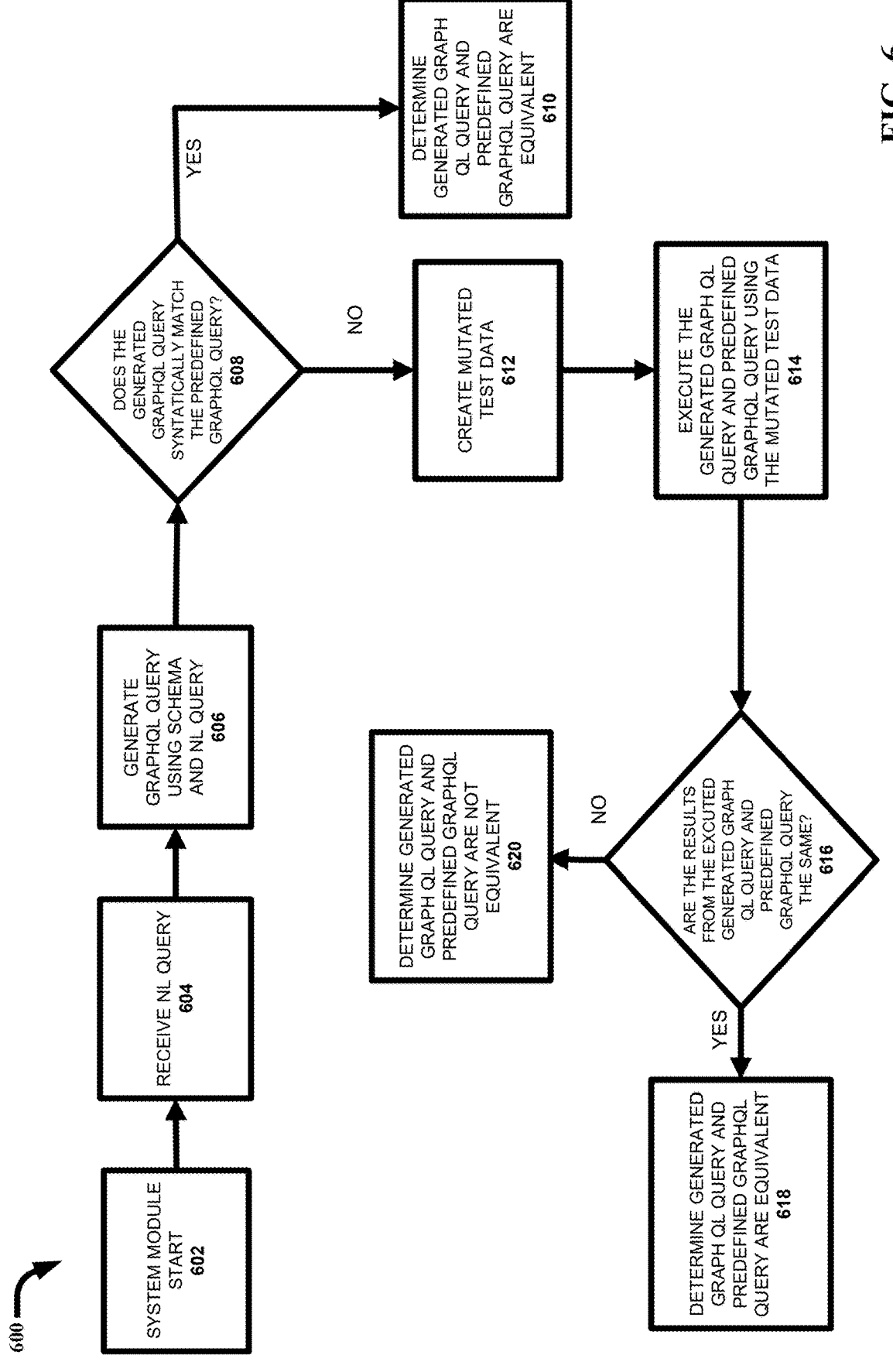
FIG. 6 illustrates a decision flow diagram for using a GraphQL query generation and evaluation system in accordance with some of the embodiments described herein.

FIG. 6 illustrates a decision flow diagram for using a GraphQL query generation and evaluation system in accordance with some of the embodiments described herein. At 602, the system module can start. At 604, the system can receive a natural language query. The system can use the natural language query along with a schema to generate a GraphQL query 606. At 608, the system can use a predefined GraphQL query to determine whether the generated GraphQL query is syntactically equivalent. To do this, the system can compare queries' structures character by character, including field names, arguments, or aliases. If the queries are syntactically equivalent, then the system can determine that the queries are equivalent 610. If the queries are equivalent, then the system can determine that the generated GraphQL query is sufficient. If the queries are syntactically different, then the system can create mutated test data 612 to run the queries. At 614, the system can execute the generated GraphQL query and the predefined GraphQL query using the mutated test data 612. Once the queries have been executed, the system can compare the results of the output from the generated GraphQL query and the predefined GraphQL query 616. If the results are the same, the system can determine that the generated GraphQL query and the predefined GraphQL query are equivalent 618. If the queries are equivalent, then the system can determine that the generated GraphQL query is sufficient. If the results are different, the system can determine that that generated GraphQL query and the predefined GraphQL query are not equivalent 620. If the queries are not equivalent, then the system can determine that the generated GraphQL query is not sufficient.

Figure 7:
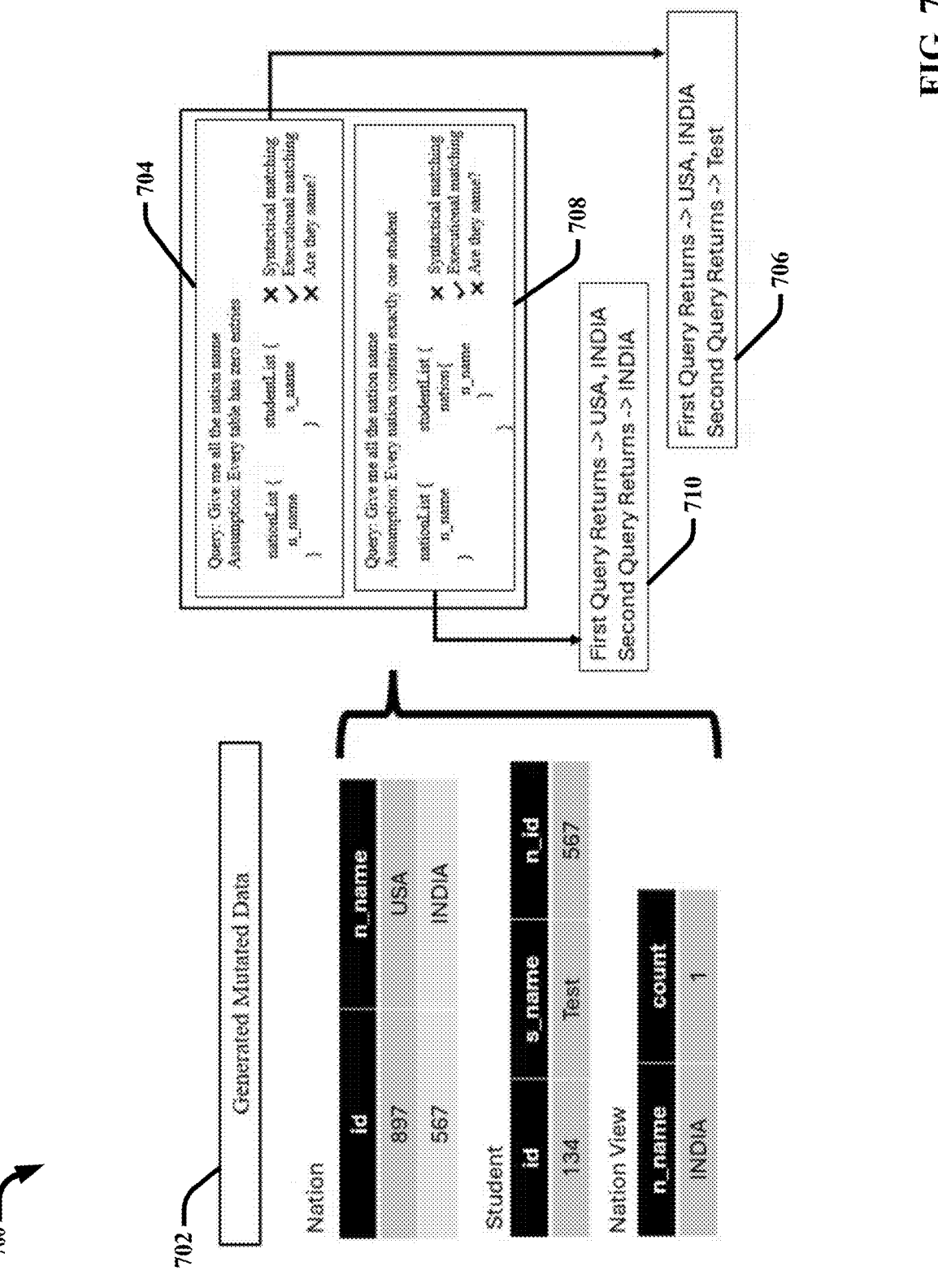
FIG. 7 illustrates two examples of handled false positive scenarios utilizing a GraphQL query generation and evaluation system in accordance with some of the embodiments described herein.

FIG. 7 illustrates two examples of handled false positive scenarios utilizing a GraphQL query generation and evaluation system in accordance with some of the embodiments described herein. GraphQL queries are executional equivalent if the two queries follow the same execution path and produce the same data result, regardless of syntactic differences. A false positive occurs when two queries are mistakenly identified as equivalent, even though they execute differently and may produce different results. At 702, the evaluation can produce mutated test data. The mutated test data can be generated to include a parent table that contains at least one more data point than the child table. In this example, the parent table is "Nation," and the child tables are "Student" and "Nation View." At 704, two queries (a predefined and generated query) can be compared for equivalence. The queries are designed to retrieve the data necessary to answer the natural language request "give me all the nation names." The two queries shown in 704 are syntactically different but executional the same. The two queries are executional the same because they follow identical logic to fetch data, even though they request data from differently named entities. When the two queries are tested with the mutated test data in 702, the queries produce different results 706. Therefore, the two queries in 704 are not equivalent and are considered false positives. At 708, two additional queries are assessed for equivalence. The two queries (a predefined and generated query) 708 are compared for equivalence. The queries are designed to retrieve the data necessary to answer the natural language request "give me all the nation names." The two queries are syntactically different but are executional equivalent, as both queries ultimately retrieve the "n_name" field through identical backend processing, despite differing in query structure. The results of processing the two queries 708 with the mutated test data from 702 show that the two queries are not equivalent 710.

Figure 8:
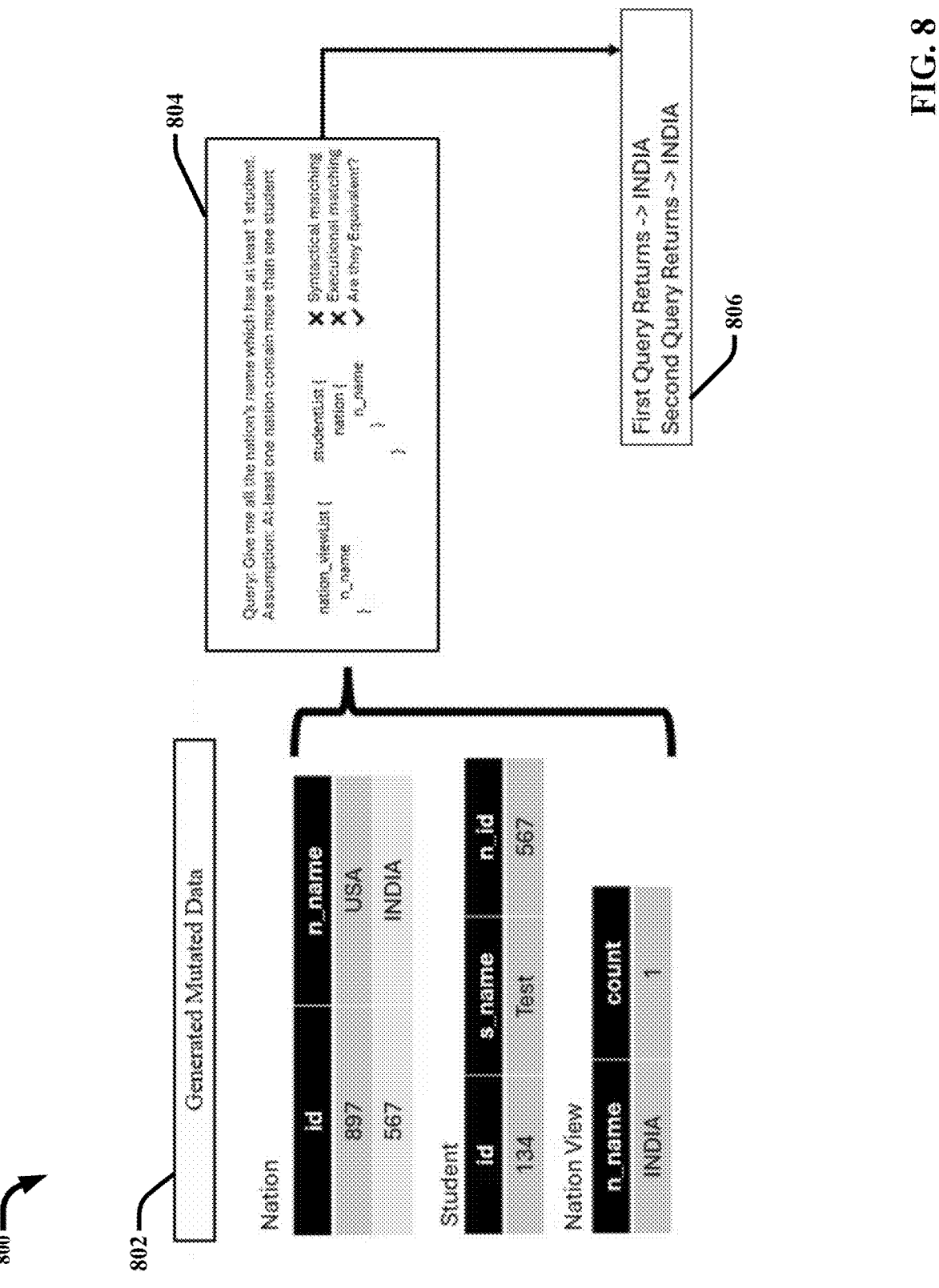
FIG. 8 illustrates an example handled false negative scenario utilizing a GraphQL query generation and evaluation system in accordance with some of the embodiments described herein.

FIG. 8 illustrates an example handled false negative scenario utilizing a GraphQL query generation and evaluation system in accordance with some of the embodiments described herein. GraphQL queries are executional equivalent if the two queries follow the same execution path and produce the same data result, regardless of syntactic differences. A false negative happens when two queries that execute identically and produce the same results are incorrectly treated as different, leading to redundant processing. At 802, the evaluation can produce mutated test data. The mutated test data can be generated to include a parent table that contains at least one more data point than the child table. In this example, the parent table is "Nation," and the child tables are "Student" and "Nation View." At 804, two queries (a predefined and generated query) are compared for equivalence. The queries are designed to retrieve the data necessary to answer the natural language request "Give me all the nation's name which has at least 1 student." The two queries 804 are syntactically different. Additionally, the two queries 804 are not executional equivalent because the first query uses "nation_viewList" to directly retrieves a list of nations, while the second query fetches a list of students and then accesses related nation data within each student entry, requiring different backend logic and data relationships. The results of processing the two queries 804 with the mutated test data from 802 show that the two queries are equivalent since results are the same 806.

FIG. 9 and the following discussion are intended to provide a brief, general description of a suitable computing environment 900 in which some embodiments described herein can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as identifying false positives or false negatives of execution equivalence of the queries with GraphQL query generation and evaluation code 980. In addition to block 980, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 945, as identified above), peripheral device set 914 (including user interface (UI), device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method can be distributed among multiple computers and/or between multiple locations. On the other hand, in this presentation of computing environment 900, detailed discussion is focused on a single computer, specifically computer 901, to keep the presentation as simple as possible. Computer 901 can be located in a cloud, even though it is not shown in a cloud in FIG. 9. On the other hand, computer 901 is not required to be in a cloud except to any extent as can be affirmatively indicated.

PROCESSOR SET 910 includes one, or more, computer processors of any type now known or to be developed in the future. Processing circuitry 920 can be distributed over multiple packages, for example, multiple, coordinated integrated circuit chips. Processing circuitry 920 can implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set can be located "off chip." In some computing environments, processor set 910 can be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods can be stored in block 945 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths and/or wireless communication paths.

VOLATILE MEMORY 912 is any type of volatile memory now known or to be developed in the future. Examples include dynamic type random access memory (RAM) or static type RAM. Typically, the volatile memory is characterized by random access, but this is not required unless affirmatively indicated. In computer 901, the volatile memory 912 is located in a single package and is internal to computer 901, but, alternatively or additionally, the volatile memory can be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 can be a read only memory (ROM), but typically at least a portion of the persistent storage allows writing of data, deletion of data and re-writing of data. Some familiar forms of persistent storage include magnetic disks and solid-state storage devices. Operating system 922 can take several forms, such as various known proprietary operating systems or open-source Portable Operating System Interface type operating systems that employ a kernel. The code included in block 945 typically includes at least some of the computer code involved in performing the inventive methods.

PERIPHERAL DEVICE SET 914 includes the set of peripheral devices of computer 901. Data communication connections between the peripheral devices and the other components of computer 901 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 923 can include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 can be persistent and/or volatile. In some embodiments, storage 924 can take the form of a quantum computing storage device for storing data in the form of qubits. In embodiments where computer 901 is required to have a large amount of storage (for example, where computer 901 locally stores and manages a large database) then this storage can be provided by peripheral storage devices designed for storing large amounts of data, such as a storage area network (SAN) that is shared by multiple, geographically distributed computers. IoT sensor set 925 is made up of sensors that can be used in Internet of Things applications. For example, one sensor can be a thermometer, and another sensor can be a motion detector.

NETWORK MODULE 915 is the collection of computer software, hardware, and firmware that allows computer 901 to communicate with other computers through WAN 902. Network module 915 can include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN can be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901) and can take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 can be a client device, such as thin client, heavy client, mainframe computer and/or desktop computer.

REMOTE SERVER 904 is any computer system that serves at least some data and/or functionality to computer 901. Remote server 904 can be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data can be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs can be stored as images and can be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware and firmware allowing public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1175 and private cloud 1176 are both part of a larger hybrid cloud. The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of some of the embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of some of the embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In some embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of some of the embodiments described herein.

Aspects of some of the embodiments described herein are described with reference to flowchart illustrations and/or block diagrams of methods, apparatus (systems), and computer program products according to some embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality, and/or operation of possible implementations of systems, computer-implementable methods, and/or computer program products according to some embodiments described herein. In this regard, each block in the flowchart or block diagrams can represent a module, segment, and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that some of the embodiments herein also can be implemented at least partially in parallel with one or more other program modules. Generally, program modules include routines, programs, components, and/or data structures that perform particular tasks and/or implement particular abstract data types. Moreover, the described computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches, and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the various embodiments, but one of ordinary skill in the art can recognize that many further combinations and/or permutations of the various embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:

a memory configured to store computer executable components; and a processor that executes at least one of the computer executable components that:

trains, using training data, an artificial intelligence model executed on a computer system to generate Graph Query Language (GraphQL) queries from natural language query received from a computing device and GraphQL schemas of a computing device, wherein the training data comprises training natural language queries, ground truth GraphQL queries respectively associated with the training natural language queries, and a GraphQL schema associated with a group of application programming interfaces of one or more databases, and wherein the training comprises, for each training natural language query of the training natural language queries:

generating, using the artificial intelligence model, a GraphQL query based on the training natural language query and the GraphQL schema;

syntactically comparing a ground truth GraphQL query associated with the training natural language query to the GraphQL query;

in response to determining that the syntactical comparison indicates that the GraphQL query is not syntactically equivalent to the ground truth GraphQL query according to a first defined criterion, creating using data from at least one table from the one or more databases, mutated data, wherein a first portion of the mutated data is configured to identify false positives, and wherein a second portion of the mutated data is configured to identify false negatives;

executing, using the mutated data, the ground truthGraphQL query to generate first results;

executing, using the mutated data, the GraphQL query to generate second results;

comparing the first results to the second results;

determining whether the GraphQL query is equivalent to the ground truth GraphQL query according to a second defined criterion and a result of the comparison of the first results to the second results; and retraining the artificial intelligence model based on the mutated data, first data from the comparison of the first results to the second results, second data from the syntactical comparison of the ground truth GraphQL query to the GraphQL query, and a result of the determination of whether the GraphQL query is equivalent to the ground truth GraphQL query.

2. The system of claim 1, wherein syntactically comparing the ground truth GraphQL query to the GraphQL query comprises determining whether the GraphQL query and the ground truth GraphQL query are syntactically identical.

3. The system of claim 2, wherein syntactically comparing the ground truth GraphQL query to the GraphQL query further comprises comparing a schema of the GraphQL query with the GraphQL schema.

4. The system of claim 1, wherein comparing the first results to the second results comprises verifying functional equivalence of the GraphQL query to the ground truth GraphQL query.

5. The system of claim 1, wherein creating the mutated data comprises modifying one or more foreign key values associated with the data from the at least one table from the one or more databases while preserving foreign key restraints associated with the one or more foreign key values.

6. The system of claim 1, wherein the at least one of the computer executable components further:

trains the artificial intelligence model to create the mutated data.

7. The system of claim 1, wherein determining whether the GraphQL query is equivalent to the ground truth GraphQL query comprises:

determining whether the GraphQL query is functionally equivalent to the ground truth GraphQL query.

8. A computer-implemented method, comprising:

training, by a system comprising a processor, using training data, an artificial intelligence model executed on a computer system to generate Graph Query Language (GraphQL) queries from natural language query received from a computing device and GraphQL schemas of a computing device, wherein the training data comprises training natural language queries, ground truth GraphQL queries respectively associated with the training natural language queries, and a GraphQL schema associated with a group of application programming interfaces of one or more databases, and wherein the training comprises, for each training natural language query of the training natural language queries:

generating, using the artificial intelligence model, a GraphQL query based on the training natural language query and the GraphQL schema;

syntactically comparing a ground truth predefined GraphQL query associated with the training natural language query to the generated GraphQL query;

in response to determining that the syntactical comparison indicates that the GraphQL query is not syntactically equivalent to the ground truth GraphQL query according to a first defined criterion, creating, using data from at least one table from the one or more databases, mutated data, wherein a first portion of the mutated data is configured to identify false positives, and wherein a second portion of the mutated data is configured to identify false negatives;

executing, using the mutated data, the ground truth GraphQL query to generate first results;

executing, using the mutated data, the GraphQL query to generate second results;

comparing the first results of the executed queries to the second results;

determining whether the GraphQL query is equivalent to the ground truth GraphQL query according to a second defined criterion and a result of the comparison of the first results to the second results; and retraining the artificial intelligence model based on the mutated data, first data from the comparison of the first results to the second results, second data from the syntactical comparison of the ground truth GraphQL query to the GraphQL query, and a result of the determination of whether the GraphQL query is equivalent to the ground truth GraphQL query.

9. The computer-implemented method of claim 8, wherein syntactically comparing the ground truth GraphQL query to the GraphQL query comprises determining whether the GraphQL query and the ground truth GraphQL query are syntactically identical.

10. The computer-implemented method of claim 9, wherein syntactically comparing the ground truth GraphQL query to the GraphQL query further comprises comparing a schema of the GraphQL query with the GraphQL schema.

11. The computer-implemented method of claim 8, wherein comparing the first results to the second results comprises verifying functional equivalence of the GraphQL query to the ground truth GraphQL query.

12. The computer-implemented method of claim 8, further comprising training the artificial intelligence model to create the mutated data.

13. The computer-implemented method of claim 8, wherein creating the mutated data comprises modifying one or more foreign key values associated with the data from the at least one table from the one or more databases while preserving foreign key restraints associated with the one or more foreign key values.

14. The computer-implemented method of claim 8, wherein determining whether the GraphQL query is equivalent to the ground truth GraphQL query comprises:

determining whether the GraphQL query is functionally equivalent to the ground truth GraphQL query.

15. A computer program product comprising a computer readable storage medium having program instructions embodied therewith, the program instructions executable by a processor to cause the processor to:

train, using training data, an artificial intelligence model executed on a computer system to generate Graph Query Language (GraphQL) queries from natural language query received from a computing device and GraphQL schemas of a computing device, wherein the training data comprises training natural language queries, ground truth GraphQL queries respectively associated with the training natural language queries, and a GraphQL schema associated with a group of application programming interfaces of one or more databases, and wherein the training comprises, for each training natural language query of the training natural language queries:

generating, using the artificial intelligence model, a GraphQL query based on the training natural language query and the GraphQL schema;

syntactically comparing a ground truth GraphQL query associated with the training natural language query to the GraphQL query;

in response to determining that the syntactical comparison indicates that the GraphQL query is not syntactically equivalent to the ground truth GraphQL query according to a first defined criterion, creating using data from at least one table from the one or more databases, mutated data, wherein a first portion of the mutated data is configured to identify false positives, and wherein a second portion of the mutated data is configured to identify false negatives;

executing, using the mutated data, the ground truth GraphQL query to generate first results;

executing, using the mutated data, the GraphQL query to generate second results;

comparing the first results to the second results;

determining whether the GraphQL query is equivalent to the ground truth GraphQL query according to a second defined criterion and a result of the comparison of the first results to the second results; and retraining the artificial intelligence model based on the mutated data, first data from the comparison of the first results to the second results, second data from the syntactical comparison of the ground truth GraphQL query to the GraphQL query, and a result of the determination of whether the GraphQL query is equivalent to the ground truth GraphQL query.

16. The computer program product of claim 15, wherein syntactically comparing the ground truth GraphQL query to the GraphQL query comprises determining whether the GraphQL query and the ground truth GraphQL query are syntactically identical.

17. The computer program product of claim 16, wherein syntactically comparing the ground truth GraphQL query to the GraphQL query further comprises comparing a schema of the GraphQL query with the GraphQL schema.

18. The computer program product of claim 15, wherein comparing the first results to the second results comprises verifying functional equivalence of the GraphQL query to the ground truth GraphQL query.

19. The computer program product of claim 15, wherein the program instructions are further executable by the processor to cause the processor to:

train the artificial intelligence model to create the mutated data.

20. The computer program product of claim 15, wherein creating the mutated data comprises modifying one or more foreign key values associated with the data from the at least one table from the one or more databases while preserving foreign key restraints associated with the one or more foreign key values.

* * * * *